(12) United States Patent  (10) Patent No.: US 6,343,986 B1
Hofer                     (45) Date of Patent:   Feb. 5, 2002

(54) COMBINE STRAW AND CHAFF SPREADER

(76) Inventor: David A. Hofer, HC 83, Box 25, Chester, MT (US) 59522

( * ) Notice: Subject to any disclaimer, the term of this patent is extended or adjusted under 35 U.S.C. 154(b) by 0 days.

(21) Appl. No.: 09/574,540

(22) Filed: May 19, 2000

Related U.S. Application Data

(60) Provisional application No. 60/135,975, filed on May 26, 1999.

(51) Int. Cl.⁷ .................................. A01F 12/30
(52) U.S. Cl. ........................... 460/111; 56/71
(58) Field of Search ................ 460/111, 112; 56/71

(56) References Cited

U.S. PATENT DOCUMENTS

| | | | |
|---|---|---|---|
| 4,292,795 A | * | 10/1981 | Linn |
| 4,383,536 A | | 5/1983 | Delorme |
| 4,617,942 A | | 10/1986 | Garner |
| 4,892,504 A | | 1/1990 | Scott et al. |
| 4,917,652 A | | 4/1990 | Glaubitz et al. |
| 5,021,030 A | | 6/1991 | Halford et al. |
| 5,215,500 A | * | 6/1993 | Kirby .................. 460/111 |
| 5,976,011 A | * | 11/1999 | Hartman ............... 460/111 |
| 6,238,286 B1 | * | 5/2001 | Aubry et al. ........... 460/111 |

FOREIGN PATENT DOCUMENTS

DE        29702265 U1  *  2/1997

* cited by examiner

Primary Examiner—H. Shackelford
(74) Attorney, Agent, or Firm—Richard C. Conover

(57) ABSTRACT

A straw and chaff spreader including a pair of counter-rotating spreader plates having fan-shaped blades attached to the top surface of each spreader plate. The spreader plates being located beneath the straw and chaff chute of a combine. A rear shield is mounted to the combine to the rear of the spreader plates. The shape of the blades and the direction of rotation of the spreader plates being selected to throw the straw and chaff received from the straw and chaff chute against the rear shield to propel the straw and chaff outwardly on either side of the combine.

3 Claims, 3 Drawing Sheets

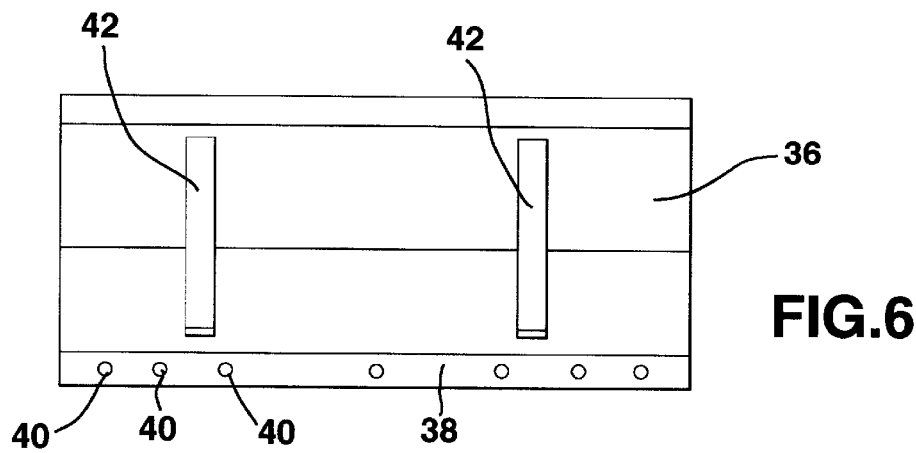
FIG.6
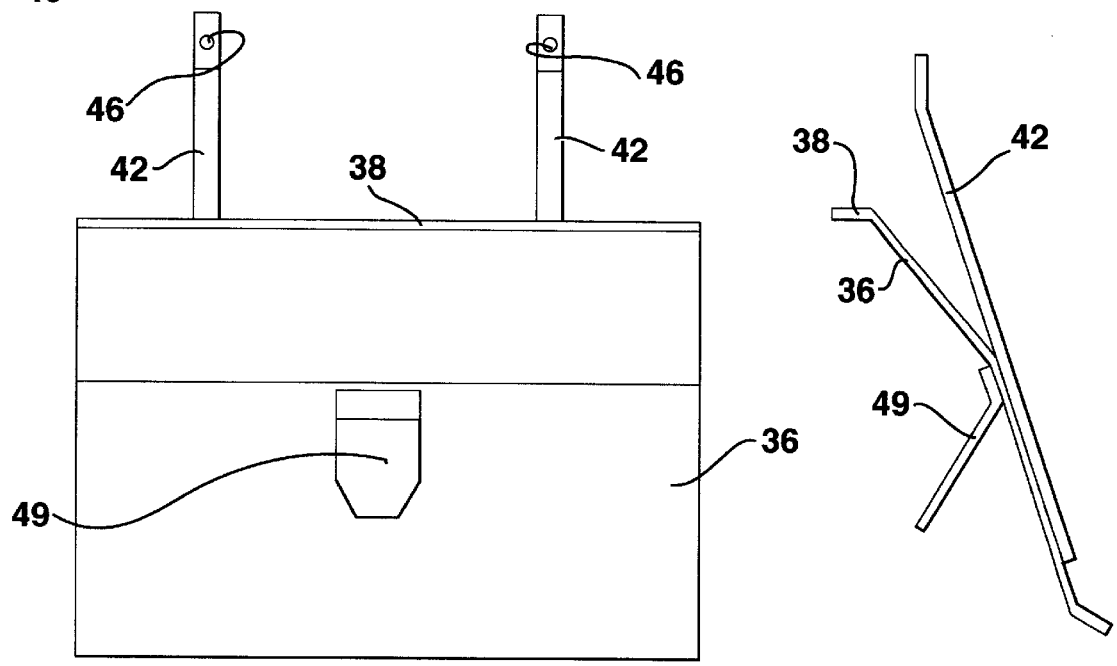
FIG.5
FIG.4
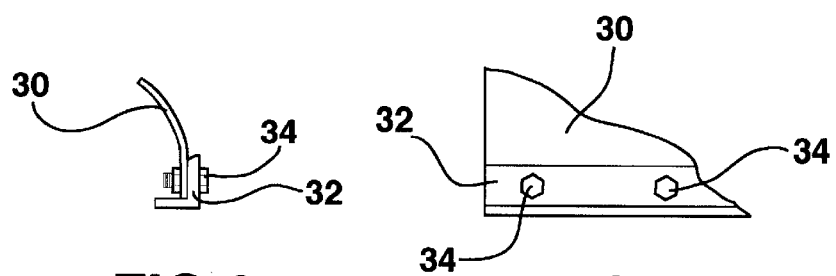
FIG.8  FIG.7

COMBINE STRAW AND CHAFF SPREADER

This appln claims benefit of Prov. No. 60/135,975 filed May 26, 1999.

BACKGROUND OF THE INVENTION

The present invention relates to a straw and chaff spreader for use with a combine to broadcast straw and chaff to the rear and opposite sides of the combine after the threshing operation.

When a conventional combine is used for harvesting grain, such as wheat, the combine machine first cuts the wheat and conveys the stalks and wheat heads upwardly into the combine. A threshing mechanism is used to separate the grain from the wheat stalk. The grain is then conveyed by the combine to a series of sieves where the chaff is blown away from the grain by blasts of air. The grain separated from the chaff is then conveyed within the combine to a grain chute while the straw stalks and chaff are typically conveyed or blown rearwardly to fall upon the ground through a rear straw and chaff outlet chute. In the absence of some mechanism for spreading the straw and chaff, the straw and chaff typically falls into a windrow trailing behind the combine harvester. These windrows create problems for farmers who generally have to use other equipment for spreading or collecting the straw to remove the windrows.

A known method of spreading straw and chaff which is better than the old method of typically allowing the straw and chaff to just exit the outlet chute onto the ground is the use of circular spreader plates rotatably mounted at the rear of the combine beneath the combine's rear straw and chaff outlet chute. U.S. Pat. No. 4,617,942 to Garner illustrates this method. Such spreader plates typically have spreader fins extending upwardly from their upper surfaces. The orientation of the fins and the direction of rotation of the counter-rotating spreader plates is selected to propel the straw and chaff rearwardly away from the harvester combine. With this equipment, the straw and chaff is blown rearwardly in a relatively concentrated stream resulting in undesirable accumulation of the straw and chaff behind the harvester combine.

Another straw and chaff spreader assembly is described in U.S. Pat. No. 5,976,011 to Hartman. In this assembly, the fins are again mounted on top of the counter-rotating spreader plates but the direction of rotation and the orientation of the fins are selected to propel the straw and chaff forwardly against a deflecting shield fixedly mounted on the rearward end of the harvester combine. The straw and chaff is directed by the rotating fins in a direction against the directional flow of the straw and chaff exiting the straw and chaff chute, and directs the straw and chaff to either side of the combine.

The present invention is an improvement over the straw and chaff spreader assemblies presently known. The direction of rotation of the straw spreaders and the orientation of the fins are selected such that the straw and chaff is moved rearwardly in the same direction as the straw and chaff exiting the straw and chaff chute. The straw and chaff is further propelled by the rotating fins against a rear deflector plate mounted to the combine. This structure propels the straw and chaff to either side of the combine a substantially large distance by combining the force of the flow of the straw and chaff being conveyed to the spreader plates with the force provided by the rotating fins. The even and wider spreading of the straw and chaff resulting from the use of this invention has several distinct advantages over the prior art spreaders. With the present invention, there is better germination of seeds, better cultivation conditions, better seed-to-soil contact, less trash interference with chemicals, more even drying of the soil, better warm-up of the soil, and less mold and other diseases which can cause crop yield losses.

SUMMARY OF INVENTION

A straw and chaff spreader includes a pair of counter-rotating spreader plates having fan-shaped blades attached to the top surface of each spreader plate. The spreader plates are located beneath the straw and chaff chute of a combine. A rear shield is mounted to the combine to the rear of the spreader plates. The shape of the blades and the direction of rotation of the spreader plates are selected to throw the straw and chaff received from the straw and chaff chute against the rear shield to propel the straw and chaff outwardly on either side of the combine.

DESCRIPTION OF THE DRAWINGS

In order that the invention may be clearly understood and readily carried into effect, a preferred embodiment of the invention will now be described, by way of example only, with reference to the accompanying drawings wherein:

FIG. 4 is an elevational view of a rear shield shown in FIG. 2;

FIG. 5 is a right side view of the rear shield shown in FIG. 4;

FIG. 6 is a top plan view of the rear shield shown in FIG. 4;

FIG. 7 is an elevational view of a slinger fin shown in FIG. 2;

FIG. 8 is a left side view of the slinger fin shown in FIG. 7; and

DESCRIPTION OF A PREFERRED EMBODIMENT

Figure 1:
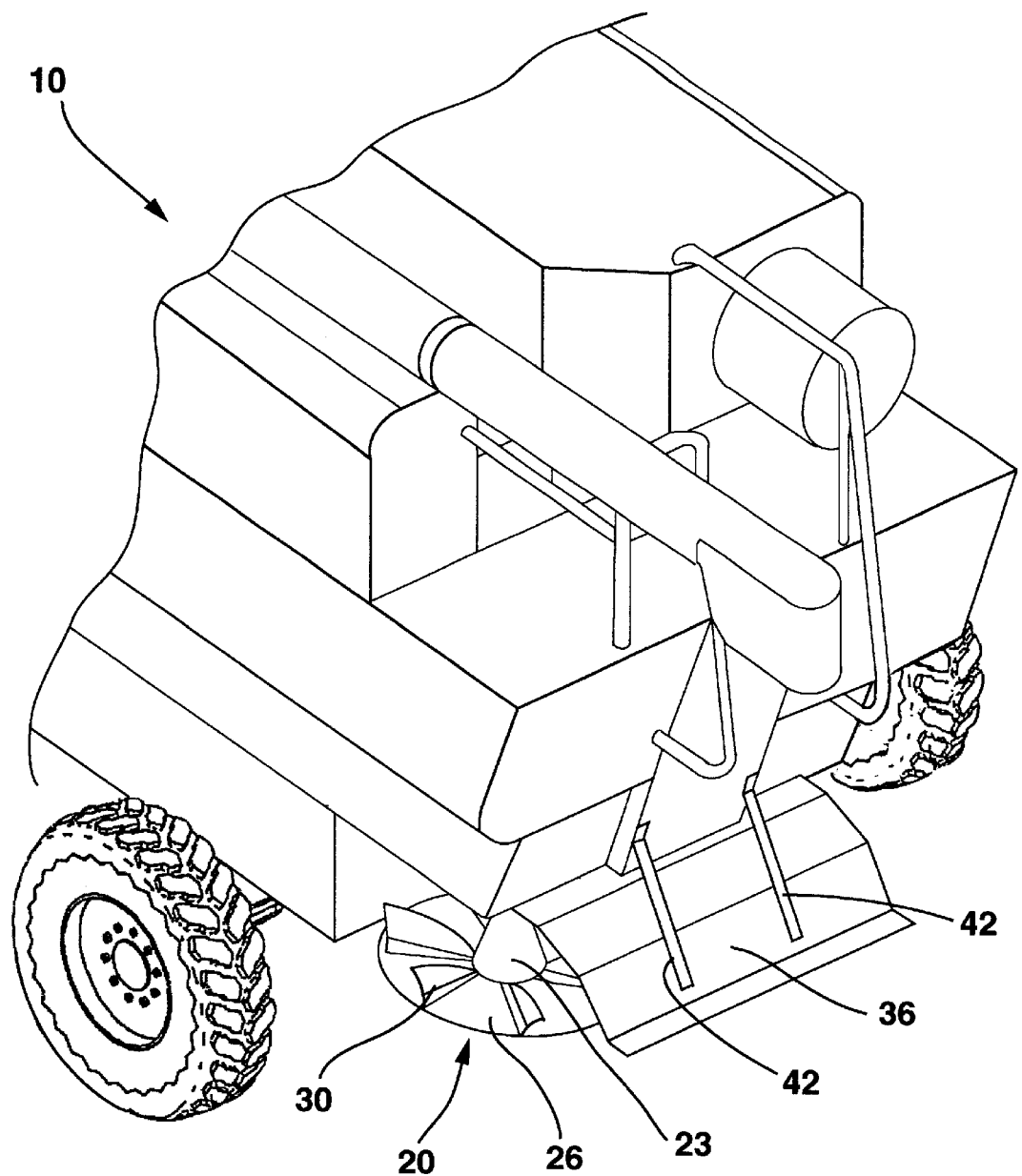
FIG. 1 is a perspective view of the present invention mounted on a combine.
Figure 2:
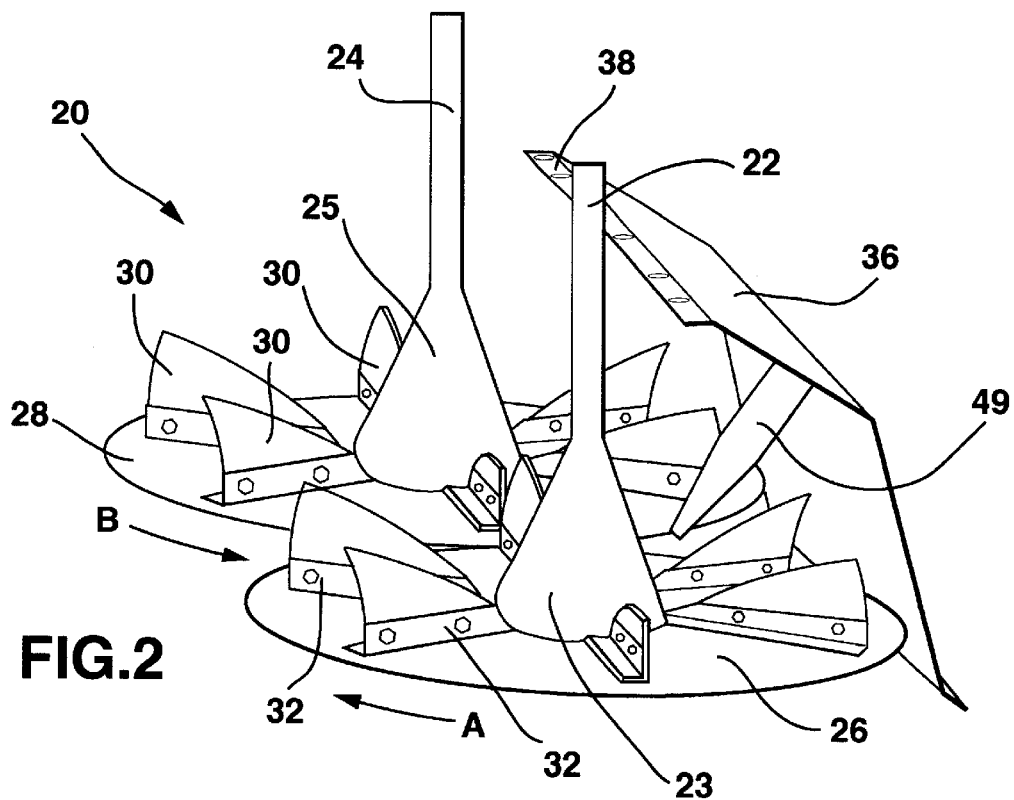
FIG. 2 is a perspective view of a straw and chaff spreader according to the present invention and shown in isolation from a conventional rotor combine.
Figure 3:
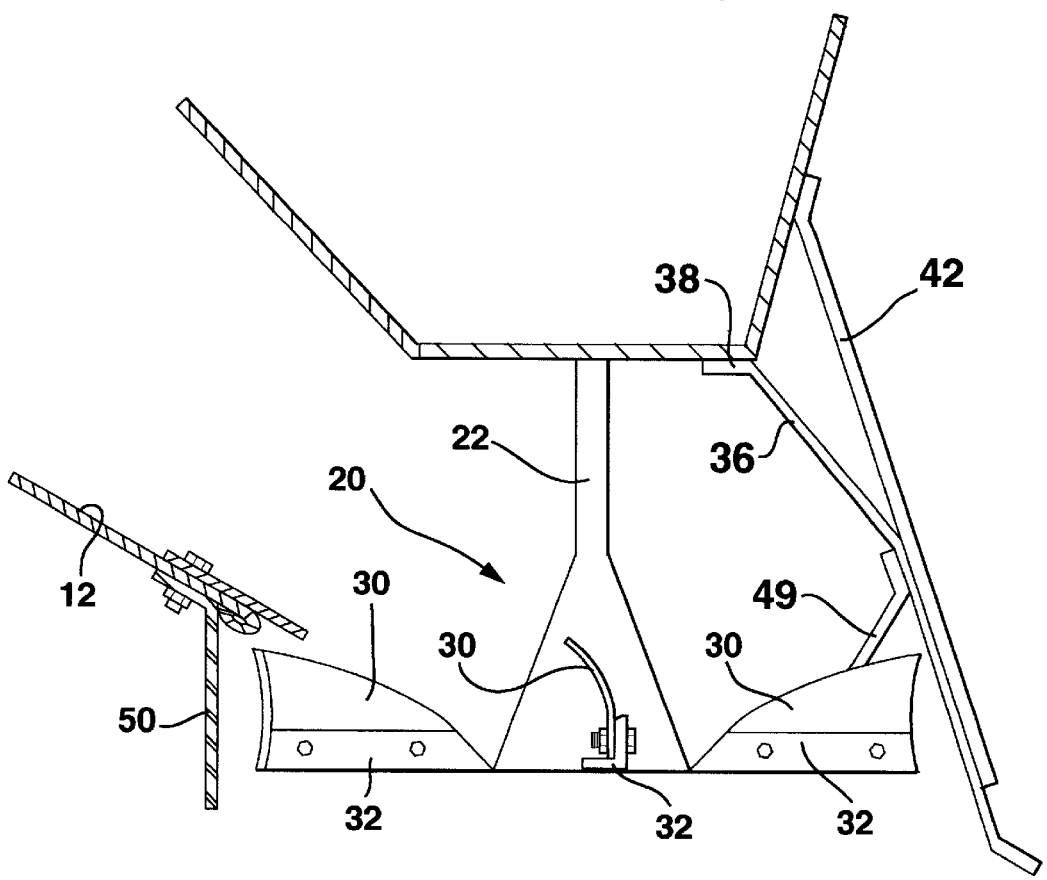
FIG. 3 is a right side view of the straw and chaff spreader shown in FIG. 2 with a conventional straw and chaff chute shown in cross-section.

A conventional harvester combine 10 is shown in FIG. 1 with a straw and chaff spreader 20 according to the present invention attached to the rear of the combine beneath a conventional straw and chaff chute 12 of the combine 10 as shown in FIG. 3. With reference to FIG. 2, the spreader 20 includes conventional counter-rotating shafts 22 and 24 which are connected to and driven by the combine 10 in a conventional manner. The shafts 22 and 24 are secured, as by welding, to conical axle linkages 23 and 25 respectively. The conical linkages 23 and 25 are secured as by welding to a conventional left spreader plate 26 and a conventional right spreader plate 28 respectively. Spreader plate 26 is rotated in a clockwise direction indicated by arrow "A" and spreader plate 28 is rotated in a counterclockwise direction indicated by arrow "B" by conventional driving equipment used with the combine.

According to the present invention, slinger blades 30 are mounted to the conventional spreader plates 26 and 28. The slinger blades are mounted to the plates 26 and 28 with iron angle bracket 32, which is fixedly attached to the plates 26 and 28 as by welding. The angle brackets 32 are mounted on the radials of plates 26 and 28 as shown. The slinger blades 30 are bolted to angle brackets 32 with bolts 34, as shown in FIGS. 7 and 8.

The slinger blades 30 are shaped to present a concave surface in the direction of movement of the spreader plates 26 and 28. The shaping of blades 30 is shown in FIGS. 7 and 8. This shaping enhances the fan-like operation of the blades 30 to create an air current which further enhances movement of straw and chaff received from chute 12 towards a rear shield 36.

The rear shield 36, as shown in FIG. 1, is fixedly secured to the combine to the rear of spreader plates 26 and 28. The rear shield 36 is also shown in detail in FIGS. 4–6. Rear shield 36 includes an upper attachment flange 38. Holes 40, as shown in FIG. 6, are drilled in flange 38 through which bolts may be inserted to attach rear shield 36 to the body of the combine. Support braces 42 are welded to the rear shield 36. The top portions of braces 42 are provided with bolt holes 46 for receiving bolts to anchor the rear shield 36 to the combine, as shown in FIG. 4.

As shown in FIGS. 4 and 5, a dividing deflector plate 49 is welded to the rear shield 36. Deflector plate 49 is positioned over the opening between spreader plates 26 and 28 adjacent the rear shield 36. The deflector plate 49 directs the straw and chaff to either side of the deflector plate 49 and prevents a substantial portion of the straw and chaff from falling through the opening between the two spreader plates 26 and 28.

In operation, straw and chaff generated by the threshing machine operation is directed in a conventional manner through chute 12 to the rotating spreader plates 26 and 28. The slinger blades 30, rotating with plates 26 and 28, catch the straw and chaff, and throw the straw and chaff toward the rear shield 36 in the same direction as the straw and chaff moving through chute 12. The rotating slinger blades 30 further act as a fan drawing air into the straw and chaff spreader and using the wind thus generated to further distribute the straw and chaff evenly away from the combine. The deflector plate 49 prevents straw and chaff from traveling downward between the spreader plates 26 and 28.

The small amount of straw and chaff being rotated toward the front of the combine is deflected by a conventional wall 50 of the combine (shown in FIG. 3) toward the ground.

While the fundamental novel features of the invention have been shown and described, it should be understood that various substitutions, modifications, and variations may be made by those skilled in the art, without departing from the spirit or scope of the invention. Accordingly, all such modifications or variations are included in the scope of the invention as defined by the following claims.

I claim:

1. A straw and chaff spreader for a combine having a forward end and a rearward end and further having a chute for transporting straw and chaff, the spreader comprising:

a left spreader plate and a right spreader plate both having a circular shape and both being rotatably attached to a rearward end of the combine at a position for receiving straw and chaff from the chute;

the spreader plates each having an axis of rotation and the spreader plates mounted in a common horizontal plane with the axes of rotation of both spreader plates aligned in a parallel relation;

a plurality of slinger blades fixedly mounted on an upper surface of each spreader plate and along a radial of each spreader plate;

means for rotating the left spreader plate in a clockwise direction and means for rotating the right spreader plate in a counterclockwise direction;

the slinger blades having a concave surface facing in the direction of rotational movement of each spreader plate;

a rear shield mounted to the rearward end of the combine and rearward of and spaced apart from the spreader plates;

the rear shield shaped to distribute straw and chaff propelled against it evenly behind and on either side of the combine; and a deflector mounted to the rear shield at a position over an opening between the spreader plates to deflect straw and chaff from falling through the opening.

2. The straw and chaff spreader according to claim 1 wherein each slinger blade is further shaped to have a taper narrowing from a periphery of the spreader plate toward the axis of rotation of the spreader plate.

3. A straw and chaff spreader for a combine having a forward end and a rearward end and further having a chute for transporting straw and chaff, the spreader comprising:

a left spreader plate and a right spreader plate both having a circular shape and both being rotatably attached to a rearward end of the combine at a position for receiving straw and chaff from the chute;

the spreader plates each having an axis of rotation and the spreader plates mounted in a common horizontal plane with the axes of rotation of both spreader plates aligned in a parallel relation;

a plurality of slinger blades fixedly mounted on an upper surface of each spreader plate and along a straight radial line of each spreader plate;

means for rotating the left spreader plate in a clockwise direction and means for rotating the right spreader plate in a counterclockwise direction;

the slinger blades having a surface concave in a direction parallel to the axis of rotation and facing in the direction of rotational movement of each spreader plate;

a rear shield mounted to the rearward end of the combine and rearward of and spaced apart from the spreader plates;

the rear shield shaped to distribute straw and chaff propelled against it evenly behind and on either side of the combine.

* * * * *